(12) United States Patent
Ryu

(10) Patent No.: US 8,371,749 B2
(45) Date of Patent: Feb. 12, 2013

(54) TEMPERATURE SENSOR

(75) Inventor: Je-Il Ryu, Seoul (KR)

(73) Assignee: Hynix Semiconductor Inc., Icheon-si (KR)

( * ) Notice: Subject to any disclaimer, the term of this patent is extended or adjusted under 35 U.S.C. 154(b) by 973 days.

(21) Appl. No.: 11/949,666

(22) Filed: Dec. 3, 2007

(65) Prior Publication Data

US 2008/0192804 A1    Aug. 14, 2008

(30) Foreign Application Priority Data

Feb. 14, 2007    (KR) .................. 10-2007-0015351

(51) Int. Cl.
*G01K 7/00*    (2006.01)
(52) U.S. Cl. .......... 374/170; 374/178; 702/99; 702/130; 327/513
(58) Field of Classification Search .................. 374/100, 374/141, 1, 163, 183, 185, 178, 179, 170–173; 702/99, 130–136; 327/512, 513, 539
See application file for complete search history.

(56) References Cited

U.S. PATENT DOCUMENTS

| | | | | |
|---|---|---|---|---|
| 4,390,874 A | * | 6/1983 | Woodside et al. | 345/101 |
| 4,575,806 A | * | 3/1986 | Aldrich et al. | 702/133 |
| 4,859,834 A | * | 8/1989 | Hausler et al. | 219/497 |
| 4,887,181 A | * | 12/1989 | Lenz | 361/103 |
| 5,752,488 A | * | 5/1998 | Hattori et al. | 123/491 |
| 7,102,417 B2 | * | 9/2006 | Gordon et al. | 327/512 |
| 7,198,403 B2 | * | 4/2007 | Proll et al. | 374/178 |
| 7,225,099 B1 | * | 5/2007 | O'Dwyer | 702/130 |
| 7,266,031 B2 | * | 9/2007 | Kim et al. | 365/211 |
| 7,443,176 B2 | * | 10/2008 | McClure et al. | 324/685 |
| 7,579,899 B2 | * | 8/2009 | Senriuchi et al. | 327/512 |
| 7,581,882 B2 | * | 9/2009 | Noguchi | 374/178 |
| 7,654,736 B1 | * | 2/2010 | Walker | 374/176 |
| 7,674,035 B2 | * | 3/2010 | Pertijs et al. | 374/1 |
| 7,686,508 B2 | * | 3/2010 | Lin et al. | 374/178 |
| 7,724,068 B1 | * | 5/2010 | Smith et al. | 327/513 |
| 2005/0063120 A1 | * | 3/2005 | Sinha et al. | 361/103 |
| 2005/0162099 A1 | * | 7/2005 | Kemper | 315/291 |
| 2005/0216220 A1 | * | 9/2005 | Kim | 702/130 |
| 2006/0116845 A1 | * | 6/2006 | Pan | 702/130 |
| 2006/0153277 A1 | * | 7/2006 | Yoshida | 374/178 |

(Continued)

FOREIGN PATENT DOCUMENTS

| | | |
|---|---|---|
| JP | 02-202219 B | 8/1990 |
| KR | 100121778 B1 | 8/1997 |
| KR | 100508073 B1 | 8/2005 |

*Primary Examiner* — Gail Verbitsky
(74) *Attorney, Agent, or Firm* — Kilpatrick Townsend & Stockton LLP

(57) ABSTRACT

A temperature sensor includes a compare subject voltage output unit, a temperature range decision unit, and a temperature signal output unit. The compare subject voltage output unit is configured to output a reference voltage having a constant value irrespective of a change of an external temperature and a third temperature voltage that decreases in response to an increase of an external temperature. The temperature range decision unit is configured to compare the reference voltage and the third temperature voltage, and output an enable signal, to indicate whether the external temperature is different from a normal temperature. The temperature signal output unit is configured to output a specific one of a plurality of high temperature signals or a specific one of a plurality of low temperature signals, to indicate a range of the external temperature, in response to the enable signal.

23 Claims, 6 Drawing Sheets

U.S. PATENT DOCUMENTS

| | | |
|---|---|---|
| 2006/0178852 A1* | 8/2006 | Johns et al. .................. 702/130 |
| 2007/0070760 A1* | 3/2007 | Kim .............................. 365/212 |
| 2007/0115032 A1* | 5/2007 | McClure et al. ................ 327/78 |
| 2007/0146047 A1* | 6/2007 | Senriuchi et al. ............. 327/512 |
| 2007/0229120 A1* | 10/2007 | Okajima et al. .............. 327/100 |
| 2007/0242540 A1* | 10/2007 | Kim et al. ..................... 365/205 |
| 2008/0169866 A1* | 7/2008 | Kleveland et al. ............ 327/539 |
| 2010/0142287 A1* | 6/2010 | Janzen et al. ............ 365/189.05 |

\* cited by examiner $V_{bg} = K*V_t + V_{be1}$

TEMPERATURE SENSOR

CROSS-REFERENCES TO RELATED APPLICATIONS

The present application claims priority to Korean patent application number 10-2007-15351, filed on Feb. 14, 2007, which is incorporated by reference in its entirety.

BACKGROUND OF THE INVENTION

The present invention relates to a semiconductor temperature sensor and, more particularly, to a temperature sensor, which is configured to sense an external temperature and output the range of a sensed temperature as an electrical signal by employing a band gap reference voltage generating circuit that provides a constant level of a reference voltage irrespective of a temperature change.

In the prior art, a temperature sensor that employs a method of directly sensing a temperature in a low temperature environment, a high temperature environment, etc. and cutting a fuse is well known. However, the conventional temperature sensor consumes much time to test products due to the time required to cut the fuse.

BRIEF SUMMARY OF THE INVENTION

The present invention is directed toward a temperature sensor for sensing a temperature and outputting a range of a sensed temperature as an electrical signal by employing properties unique to a band gap reference voltage generating circuit.

In one embodiment, a temperature sensor includes a compare subject voltage output unit, a temperature range decision unit, and a temperature signal output unit. The compare subject voltage output unit is configured to output a reference voltage having a constant value irrespective of a change of an external temperature and a third temperature voltage that decreases in response to an increase of an external temperature. The temperature range decision unit is configured to compare the reference voltage and the third temperature voltage, and output an enable signal, to identify whether the external temperature is different from a normal temperature. The temperature signal output unit is configured to output a specific one of a plurality of high temperature signals or a specific one of a plurality of low temperature signals, to identify a range of the external temperature, in response to the enable signal.

DESCRIPTION OF SPECIFIC EMBODIMENTS

Specific embodiments according to the present invention will be described with reference to the accompanying drawings.

Figure 1:
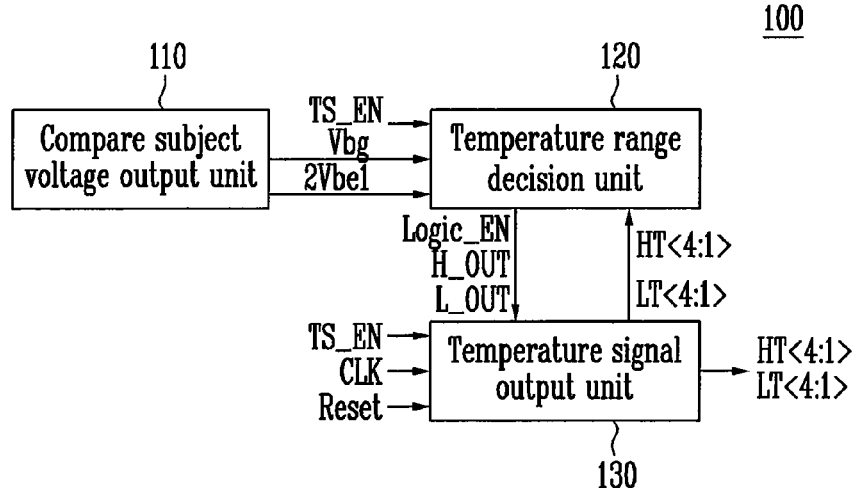
FIG. 1 is a block diagram showing a construction of a temperature sensor according to an embodiment of the present invention.

FIG. 1 is a block diagram showing a construction of a temperature sensor according to an embodiment of the present invention.

The temperature sensor 100 includes a compare subject voltage output unit 110 for outputting a to-be-compared voltage that becomes a basis for determining a range of an external temperature, a temperature range decision unit 120 for outputting an enable signal that identifies whether the external temperature is different from normal temperature based on the to-be-compared voltage, and a temperature signal output unit 130 for outputting a specific one of a plurality of high temperature signals or a specific one of a plurality of low temperature signals, which indicates the range of the external temperature, in response to the enable signal.

Figure 2:
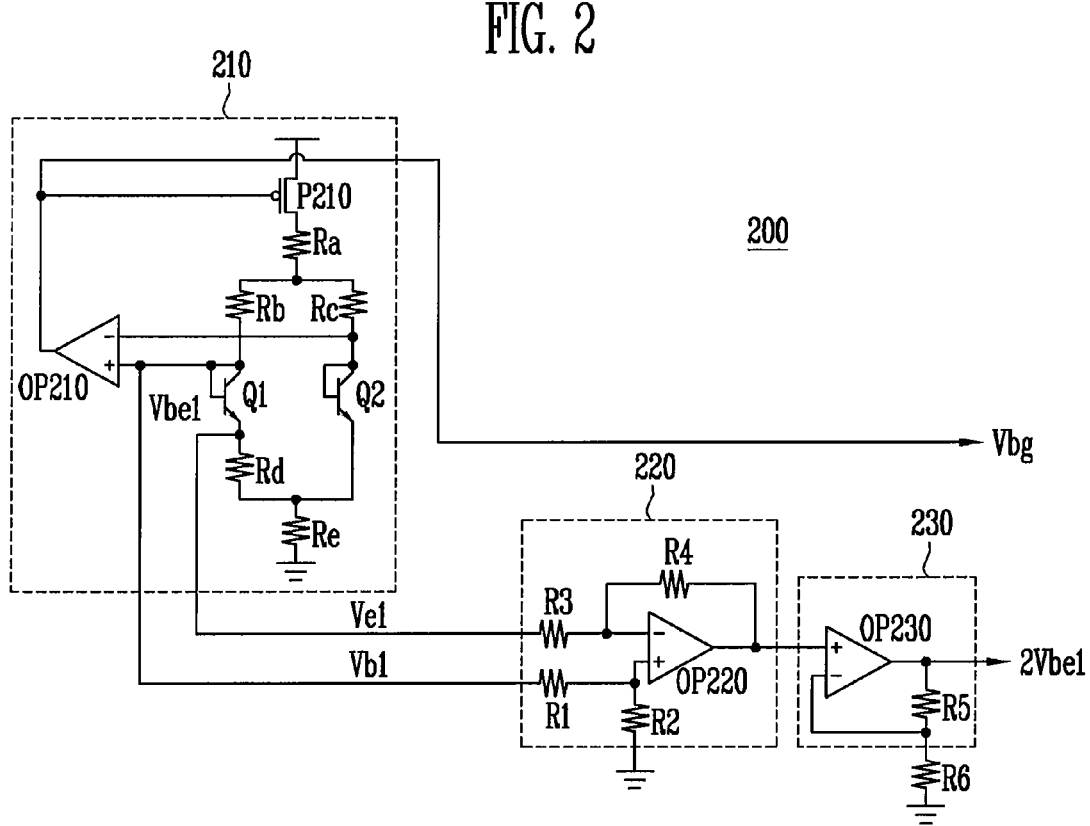
FIG. 2 is a circuit diagram of a compare subject voltage output unit according to an embodiment of the present invention.

FIG. 2 is a circuit diagram of the compare subject voltage output unit 110 according to an embodiment of the present invention.

Referring to FIGS. 1 and 2, the compare subject voltage output unit 110 outputs a reference voltage that is maintained at a constant voltage level irrespective of an external temperature change, and a third temperature voltage 2Vbe1 that decreases in response to an increase of an external temperature.

To this end, the compare subject voltage output unit 110 includes, as shown in FIG. 2, a voltage output unit 210 that outputs a first temperature voltage Vb1 and a second temperature voltage Ve1, which are changed according to an external temperature change, a difference voltage generator 220 for generating a difference voltage Vbe1 between the first temperature voltage Vb1 and the second temperature voltage Ve1 of the voltage output unit 210, and a temperature voltage amplifier 230 for amplifying the difference voltage Vbe1 to a third temperature voltage 2Vbe1.

The voltage output unit 210 includes a band gap reference circuit. The band gap reference circuit includes a first BJT transistor Q1 and a second BJT transistor Q2, which are diode connected in a mirror fashion, a resistor Rb connected in series to a collector of the first BJT transistor, a resistor Rd connected in series to an emitter of the first BJT transistor, a resistor Rc connected in series to a collector of the second BJT transistor, and an operational amplifier OP210 having a non-inverting terminal to which the output of the collector terminal of the first BJT transistor is input and an inverting terminal to which the output of the collector terminal of the second BJT transistor is input, and configured to output a reference voltage Vbg.

The band gap reference circuit further includes a resistor Ra connected in series to a parallel connection node of the resistors Rb, Rc, a PMOS transistor P210 for applying a power supply voltage Vcc to the resistor Ra according to a level of the reference voltage, and a resistor Re connected in series between the resistor Rd, a parallel connection node of the second BJT transistor, and a ground node.

The output of the band gap reference circuit combines two components that vary differently according to an external temperature change, and outputs the reference voltage Vbg having a constant voltage level irrespective of an external temperature change. The band gap reference circuit is described in detail with reference to the drawings.

Figure 3:
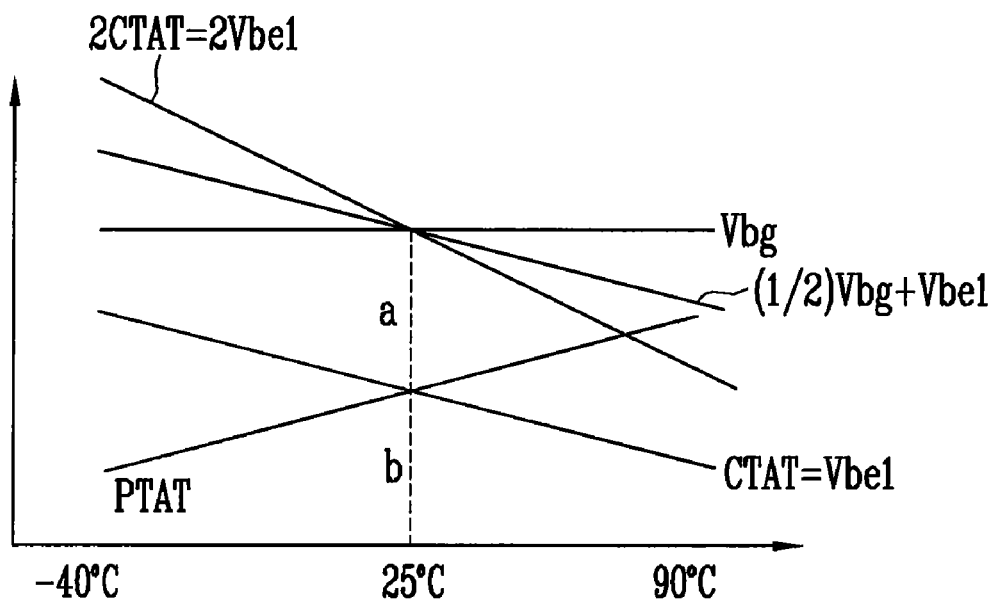
FIG. 3 is a graph showing a principle of forming a reference voltage.

FIG. 3 is a graph showing a principle of forming a reference voltage.

As shown in the drawing, the band gap reference circuit combines a component (PTAT: Proportional To Absolute Temperature) that varies in proportion to an increase of a temperature and a component (CTAT: Complementary To Absolute Temperature) that varies inversely proportional to an increase of a temperature, and outputs the reference voltage Vbg having a constant voltage level irrespective of a change of a temperature.

The PTAT component may include k*Vt (k: constant and Vt: the threshold voltage of a transistor), and the CTAT component may include the difference voltage Vbe1 of the first temperature voltage Vb1 and the second temperature voltage Ve1.

In embodiments of the present invention, the difference voltage is amplified such that there is a point where the difference voltage is identical to the reference voltage, and a difference between the two voltages is determined based on the point in order to determine a range of a corresponding temperature.

In other words, as shown in FIG. 3, in the event that the difference voltage is amplified twice, if a point where the difference voltage is identical to the reference voltage is 25 degrees Celsius, the level of the amplified difference voltage varies according to a change of an external temperature. In this case, a range of the temperature is measured based on a difference between a changed value and a reference voltage value, and a temperature signal is output.

Therefore, the voltage output unit 210 included in the compare subject voltage output unit 110 of FIG. 2 includes the band gap reference circuit that outputs a constant voltage level irrespective of a change of a temperature. The difference voltage generator 220 also generates the CTAT component by employing a voltage output from a specific node of the band gap reference.

The difference voltage generator 220 includes an operational amplifier OP220 configured to amplify the first voltage Vb1 and the second voltage Ve1 of the voltage output unit 210 and generate the difference voltage Vbe1, a resistor R1 connected between a base terminal of the first BJT transistor Q1 of the voltage output unit 210 and a non-inverting terminal of the operational amplifier OP220, a resistor R2 connected between the non-inverting terminal of the operational amplifier OP220 and a ground power supply, a resistor R3 connected between an emitter terminal of the second BJT transistor Q2 and the inverting terminal of the operational amplifier OP220, and a resistor R4 connected between the inverting terminal and the output terminal of the operational amplifier OP220.

Desirably, the resistance of the resistors R1, R2, R3 and R4 is same value.

A process of inducing a mathematical equation for generating an output voltage through the operational amplifier OP220 is well known to those having ordinary skill in the art, and a description thereof is omitted for simplicity.

The difference voltage generator 220 outputs the difference voltage Vbe1=Vb1−Ve1 in which the second voltage Ve1 is subtracted from the first voltage Vb1 according to the above construction.

The temperature voltage amplifier 230 amplifies the difference voltage Vbe1, received from the difference voltage generator 220, to a specific level or higher so that the difference voltage crosses the reference voltage at a certain temperature level. In the present embodiment, the difference voltage Vbe1 is amplified twice so that it is located at a crossing point of normal temperature 25 degrees Celsius.

In the illustrated embodiment, the operational amplifier OP230 has a non-inverting terminal to which the difference voltage Vbe1 is input, and resistors R5 and R6 connected in series between an output terminal of the operational amplifier OP230 and a ground power supply. A connection node of the resistors is connected to an inverting terminal of the operational amplifier OP230.

Desirably, the resistance of the resistors R5 and R6 is the same value.

The output voltage of the operational amplifier OP230 is (1+R5/R6)*Vbe1, resulting in 2Vbe1 that has been amplified twice.

The amplification level may be controlled in various ways according to embodiments, and such control is easily changed by those having ordinary skill in the art.

In other words, the compare subject voltage output unit 110 outputs the reference voltage Vbg that is maintained at a constant voltage level irrespective of an external temperature change, and the third temperature voltage 2Vbe1 that decreases in response to an increase of an external temperature.

Figure 4:
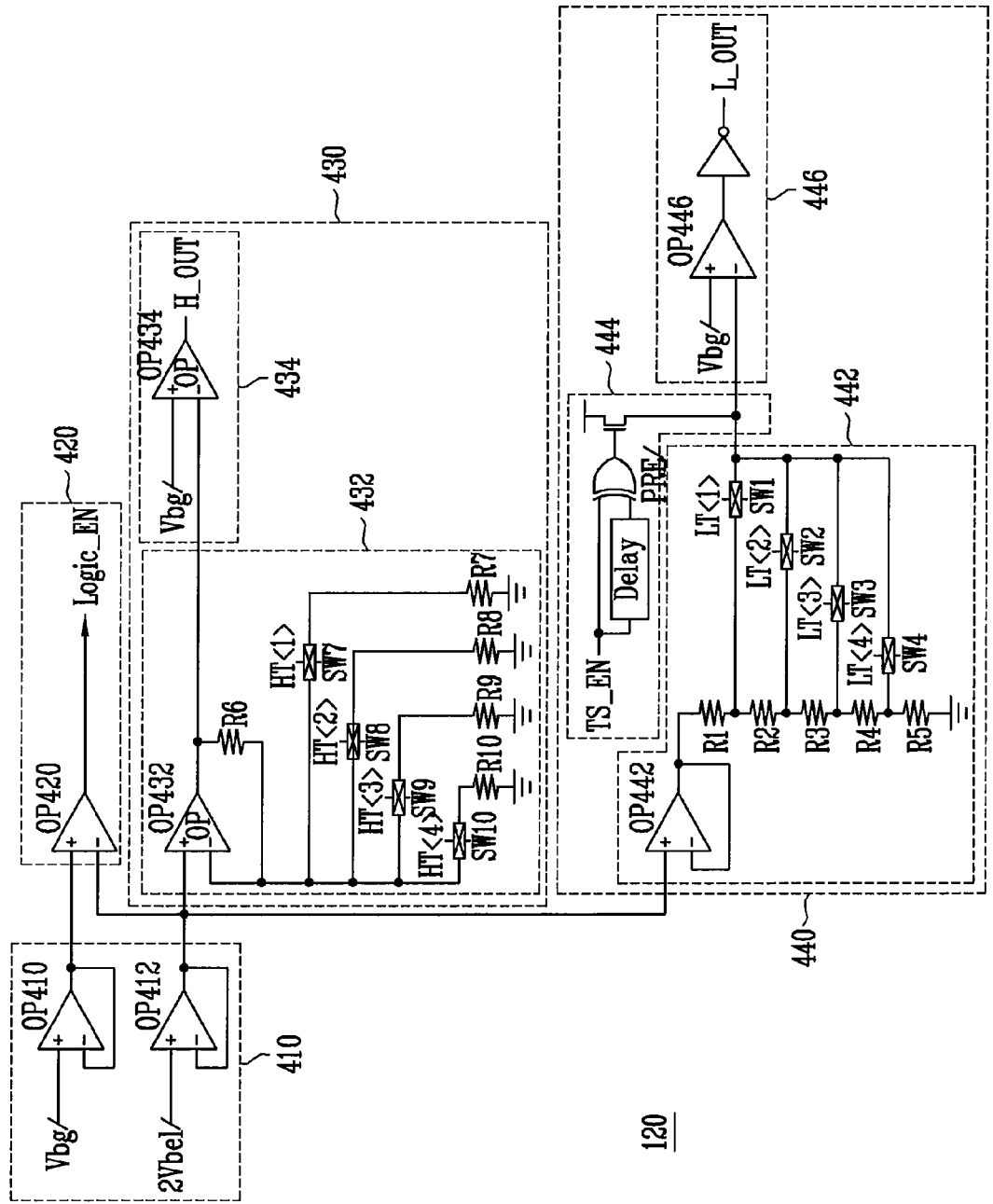
FIG. 4 is a circuit diagram of a temperature range decision unit according to an embodiment of the present invention.

FIG. 4 is a circuit diagram of the temperature range decision unit according to an embodiment of the present invention.

Referring to FIGS. 1 and 4, the temperature range decision unit 120 is configured to increase a third temperature voltage in response to a high temperature signal, compare an increased temperature voltage and the reference voltage, and output a high temperature range signal H_OUT to control the driving of the temperature signal output unit 130 according to the comparison result. The temperature range decision unit 120 is also configured to decrease the third temperature voltage in response to a low temperature signal, compare the third temperature voltage and the reference voltage, and output a low temperature range signal L_OUT to control operation of the temperature signal output unit 130 according to the comparison result.

To this end, the temperature range decision unit 120 includes a voltage input unit 410 for receiving the reference voltage Vbg (i.e., a to-be-compared voltage) and the third temperature voltage 2Vbe1 from the compare subject voltage output unit 110; a temperature signal output controller 420 for comparing the to-be-compared voltage and the third temperature voltage 2Vbe1, and outputting the enable signal of a high level when an external temperature is higher than a normal temperature and the enable signal of a low level when an external temperature is lower than normal temperature; a high temperature range decision unit 430 for increasing the third temperature voltage in response to the high temperature signal, comparing the reference voltage and an increased temperature voltage, and controlling the driving of the temperature signal output unit according to the comparison result; and a low temperature range decision unit 440 for decreasing the third temperature voltage in response to the low temperature signal, comparing the reference voltage and a decreased temperature voltage, and controlling the driving of the temperature signal output unit according to the comparison result.

The voltage input unit 410 includes an operational amplifier OP410 having a non-inverting terminal to which the reference voltage Vbg is input, and an inverting terminal and an output terminal connected together. The voltage input unit 410 further includes an operational amplifier OP412 having a non-inverting terminal to which the third temperature voltage 2Vbe1 is input, and an inverting terminal and an output terminal connected together. Thus, an output voltage of each operational amplifier is identical to an input voltage.

Each of the operational amplifiers OP410, OP412 receives an input voltage, and transfers the input voltage to the temperature signal output controller 420, the high temperature range decision unit 430, the low temperature range decision unit 440 and so on.

The temperature signal output controller 420 is configured to compare the reference voltage Vbg and the third temperature voltage 2Vbe1, output the enable signal of a high level Logic_EN to operate a high temperature signal output unit 620 (refer to FIG. 6) of the temperature signal output unit 130 when the reference voltage Vbg is greater than the third temperature voltage 2Vbe1 and the enable signal of a low level Logic_EN to operate a low temperature signal output unit 640 (refer to FIG. 6) of the temperature signal output unit 130 when the reference voltage Vbg is smaller than the third temperature voltage 2Vbe1.

The temperature signal output controller 420 includes an operational amplifier OP420 having a non-inverting terminal to which the reference voltage Vbg is input and an inverting terminal to which the third temperature voltage 2Vbe1 is input. The temperature signal output controller 420 outputs the enable signal of a high level Logic_EN when the reference voltage Vbg is greater than the third temperature voltage 2Vbe1.

The high temperature range decision unit 430 includes a high temperature amplifier 432 for amplifying the third temperature voltage 2Vbe1 to a specific level or higher according to a temperature signal of the temperature signal output unit 130, and a high temperature range signal output unit 434 for comparing the amplified third temperature voltage 2Vbe1 and the reference voltage Vbg and outputting a signal to control the operation of the temperature signal output unit when the reference voltage is greater than the amplified third temperature voltage. In this case, when the reference voltage is greater than the amplified third temperature voltage, the high temperature range signal output unit 434 outputs a high temperature range signal of a high level such that a high temperature signal, indicating a temperature range higher than the specific high temperature signal, is output.

The high temperature amplifier 432 has a non-inverting operational amplifier structure. That is, the high temperature amplifier 432 includes an operational amplifier OP432 having a non-inverting terminal to which the third temperature voltage 2Vbe1 is input, a feedback resistor R6 connected between an inverting terminal and an output unit of the operational amplifier OP432, resistors R7 to R10 connected to the inverting terminal of the operational amplifier OP432 according to specific temperature signals HT<4:1>, respectively, and switching elements SW7 to SW10 for connecting the inverting terminal of the operational amplifier OP432 and the specific resistors according to the specific temperature signals HT<4:1>, respectively.

The high temperature amplifier 432 may connect a resistor with a lower resistance, of the plurality of resistors, to the inverting terminal of the operational amplifier OP432 when a high temperature signal indicating a higher temperature, of the plurality of high temperature signals, is input. According to this construction, an increment of the third temperature voltage can be further increased.

The specific resistors may have the following relationship.

$$R7=2sR8=3sR9=4sR10$$

Accordingly, if a specific temperature signal, for example HT<1>, is applied from the temperature signal output unit 130, the switching element SW7 is turned on, and hence the inverting terminal of the operational amplifier OP432 is connected to the resistor R7, so that the third temperature voltage 2Vbe1 is amplified.

The output voltage of the high temperature amplifier 432 can be expressed in the following equation.

$$HT\langle 1\rangle \text{ turn-on:} \left(1 + \frac{R6}{R7}\right)s2Vbe1 \qquad \text{[Equation 1]}$$

$$HT\langle 2\rangle \text{ turn-on:} \left(1 + \frac{R6}{R8}\right)s2Vbe1 = \left(1 + \frac{2sR6}{R7}\right)s2Vbe1$$

$$HT\langle 3\rangle \text{ turn-on:} \left(1 + \frac{R6}{R9}\right)s2Vbe1 = \left(1 + \frac{3sR6}{R7}\right)s2Vbe1$$

$$HT\langle 4\rangle \text{ turn-on:} \left(1 + \frac{R6}{R10}\right)s2Vbe1 = \left(1 + \frac{4sR6}{R7}\right)s2Vbe1$$

The high temperature range signal output unit 434 compares the output of the high temperature amplifier 432 and the reference voltage Vbg, and outputs a signal that indicates whether an external temperature is higher than a temperature specified by the temperature signal.

To this end, the high temperature range signal output unit 434 includes an operational amplifier OP434 having a non-inverting terminal to which the reference voltage Vbg is input and an inverting terminal to which the amplified third temperature voltage 2Vbe1 is input, and configured to output a temperature range signal.

Thus, if the reference voltage Vbg is greater than the output of the high temperature amplifier 432, the high temperature range signal output unit 434 outputs the high temperature range signal H_OUT at a high level, indicating that an external temperature is higher than a temperature specified by the temperature signal.

The operation of the high temperature amplifier 432 and the high temperature range signal output unit 434 is described in detail with reference to the drawings.

Figure 8:
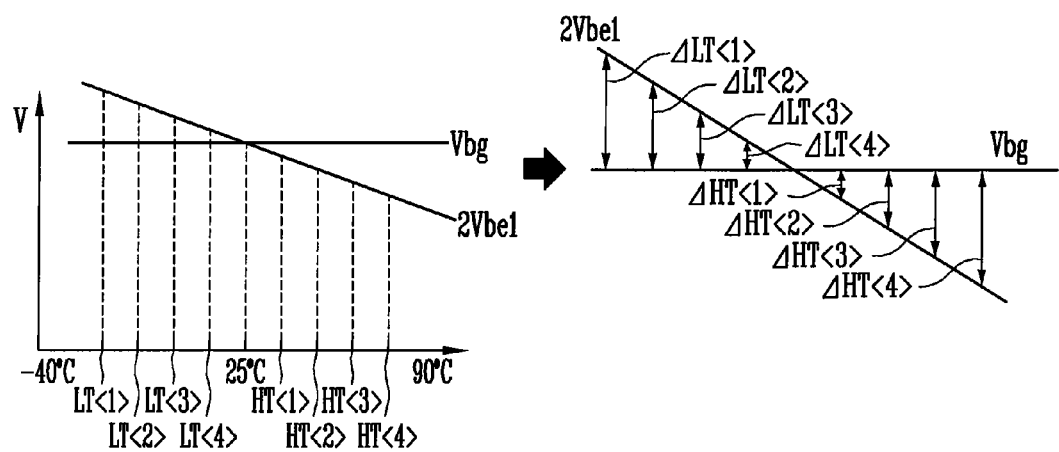
FIG. 8 is a graph showing an operation principle of a temperature sense circuit according to the present invention.

FIG. 8 is a graph showing an operation principle of the temperature sense circuit according to the present invention.

An abscissa axis indicates a current temperature, and a vertical axis indicates a voltage level.

It is assumed that the current temperature is in the range of HT<1> and HT<2>. Since a reference voltage is greater than the third temperature voltage 2Vbe1, the temperature signal output controller 420 outputs the enable signal at a high level Logic_EN. The temperature signal output unit 130 operates in response to the signal, and outputs the first high temperature signal HT<1>. The switching element SW7 of the high temperature amplifier 432 is turned on in response to the first high temperature signal HT<1>, so that the third temperature voltage 2Vbe1 is amplified as much as ΔHT<1>. However, as can be seen from the graph of FIG. 8, the reference voltage is still greater than an amplified third temperature voltage 2Vbe1 despite such amplification. Thus, the high temperature range signal output unit 434 outputs the high temperature range signal H_OUT at a high level.

The temperature signal output unit 130 outputs the second high temperature signal HT<2> in response to the high temperature range signal H_OUT at a high level. The switching element SW8 of the high temperature amplifier 432 is turned on in response to the second high temperature signal HT<2>, so that the third temperature voltage 2Vbe1 is amplified as much as ΔHT<2>. As can be seen from the graph of FIG. 8, the reference voltage is smaller than an amplified third temperature voltage 2Vbe1 due to such amplification. Thus, the high temperature range signal output unit 434 outputs the high temperature range signal H_OUT at a low level. The operation of the temperature signal output unit 130 is stopped in response thereto.

The low temperature range decision unit 440 includes a low temperature amplifier 442 configured to amplify the third temperature voltage 2Vbe1 in such a way that it decreases to a specific level according to the temperature signal of the temperature signal output unit 130, and a low temperature range signal output unit 446 configured to compare the decreased third temperature voltage 2Vbe1 and the reference voltage Vbg and output a signal to control the operation of the temperature signal output unit when the reference voltage is greater than the decreased third temperature voltage. In this case, when the reference voltage is smaller than the decreased third temperature voltage, the low temperature range signal output unit may output a low temperature range signal at a high level so that a low temperature signal, indicating a temperature range lower than the specific low temperature signal, is output.

The low temperature range decision unit 440 further includes a reset unit 444 for applying a power supply voltage Vcc greater than the reference voltage Vbg to the low temperature range signal output unit 446 such that the low temperature range signal L_OUT at a high level is output at an initial operation of the low temperature range decision unit 440.

The low temperature amplifier 442 has a structure in which the third temperature voltage 2Vbe1 is divided through resistors connected in series to one another. The low temperature amplifier 442 includes a plurality of resistors R1 to R5 having their voltage dividing ratios controlled according to specific temperature signals LT<4:1> and connected in series to one another, and a plurality of switching elements SW1 to SW4 for selecting a specific connection node between the resistors in response to the specific temperature signals LT<4:1> and controlling the dividing ratios.

The low temperature amplifier 442 may control the voltage dividing ratios such that a decrement of the third temperature voltage is increased when a low temperature signal indicating a lower temperature, of the plurality of low temperature signals, is input.

The resistors may have the following relationship.

R2=R3=R4=R5

The low temperature amplifier 442 may further include an operational amplifier OP442 having a non-inverting terminal to which the third temperature voltage 2Vbe1 is input, and an inverting terminal and an output terminal connected together so that the third temperature voltage 2Vbe1 is received stably.

Therefore, if a specific temperature signal, for example LT<1> is received from the temperature signal output unit 130, the switching element SW1 is turned on and a connection node of the resistor R1 and the resistor R2 is selected, so that the third temperature voltage 2Vbe1 is distributed accordingly.

The output voltage of the low temperature amplifier 442 can be expressed in the following equation.

[Equation 2]

$$LT\langle 1\rangle \text{ turn-on:} \left(\frac{R2+R3+R4+R5}{R1+R2+R3+R4+R5}\right)s2Vbe1 =$$
$$\left(1+\frac{4sR2}{R1+4sR2}\right)s2Vbe1$$

$$LT\langle 2\rangle \text{ turn-on:} \left(\frac{R3+R4+R5}{R1+R2+R3+R4+R5}\right)s2Vbe1 =$$
$$\left(1+\frac{3sR2}{R1+4sR2}\right)s2Vbe1$$

$$LT\langle 3\rangle \text{ turn-on:} \left(\frac{R4+R5}{R1+R2+R3+R4+R5}\right)s2Vbe1 =$$
$$\left(1+\frac{2sR2}{R1+4sR2}\right)s2Vbe1$$

$$LT\langle 4\rangle \text{ turn-on:} \left(\frac{R5}{R1+R2+R3+R4+R5}\right)s2Vbe1 =$$
$$\left(1+\frac{R2}{R1+4sR2}\right)s2Vbe1$$

The low temperature range signal output unit 446 compares the output of the low temperature amplifier 442 and the reference voltage Vbg, and outputs a signal, indicating whether an external temperature is higher than a temperature specified by the temperature signal.

To this end, the low temperature range signal output unit 446 includes an operational amplifier OP446 having a non-inverting terminal to which the reference voltage Vbg is input and an inverting terminal to which the amplified third temperature voltage 2Vbe1 is input and configured to output a temperature range signal, and an inverter IV446 for inverting the output of the operational amplifier OP446.

Therefore, when the reference voltage Vbg is greater than the output of the high temperature amplifier 442, the low temperature range signal output unit 446 outputs the low temperature range signal L_OUT at a high level, indicating that an external temperature is lower than a temperature specified by the temperature signal.

Meanwhile, the reset unit 444 includes an XOR gate configured to receive a driving signal TS_EN of the temperature sensor and a delayed signal of the driving signal, which is delayed by a certain time, and output a reset control signal PRE; and a NMOS transistor for supplying the low temperature range signal output unit 446 with a power supply voltage Vcc in response to the reset control signal PRE. An operation of the reset unit 444 is described below with reference to the drawings.

Figure 5:
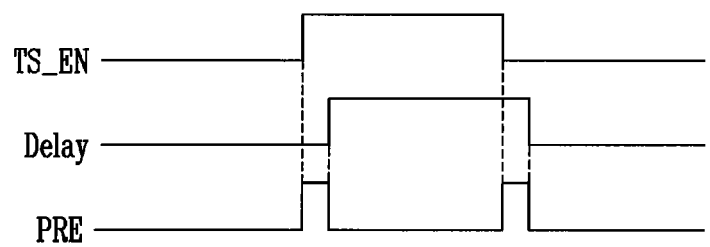
FIG. 5 shows a waveform illustrating a process of generating a reset unit control signal.

FIG. 5 shows a waveform illustrating a process of generating a reset unit control signal.

If an XOR operation is performed on the driving signal TS_EN of the temperature sensor and a delayed signal of the driving signal, which is delayed by a certain time, the control signal PRE as shown is output. If the control signal is at a high level, the NMOS transistor is turned on, so that the power supply voltage Vcc is supplied to the low temperature range signal output unit 446. When the power supply voltage Vcc higher than the reference voltage is received, the low temperature range signal output unit 446 is reset by outputting the low temperature range signal of a high level.

The operation of the low temperature amplifier 442 and the low temperature range signal output unit 446 is described in detail below with reference to FIG. 8.

It is first assumed that a current temperature ranges between LT<1> and LT<2>. In this case, since the reference voltage is smaller than the third temperature voltage 2Vbe1, the temperature signal output controller 420 outputs the enable signal Logic_EN at a low level. The temperature signal output unit 130 operates in response to the enable signal Logic_EN, and outputs the first low temperature signal LT<1>. The switching element SW1 of the low temperature amplifier 442 is turned on in response to the first low temperature signal LT<1>, so that the third temperature voltage 2Vbe1 is decreased as much as ALT<1>. However, as can be seen from the graph of FIG. 8, the reference voltage is still smaller than the third temperature voltage 2Vbe1 despite such amplification. Thus, the low temperature range signal output unit 446 outputs the low temperature range signal L_OUT at a high level.

The temperature signal output unit 130 outputs the second low temperature signal LT<2> in response to the low temperature range signal L_OUT. Consequently, the switching element SW2 of the low temperature amplifier 442 is turned on in response to the second low temperature signal LT<2>, and the third temperature voltage 2Vbe1 is decreased as much as ALT<2>. As can be seen from the graph of FIG. 8, the reference voltage is greater than the third temperature voltage 2Vbe1 due to such amplification and, therefore, the low temperature range signal output unit 446 outputs the low temperature range signal L_OUT at a low level. In response thereto, the operation of the temperature signal output unit 130 is stopped.

In other words, the temperature range decision unit 120 determines the state of an external temperature based on the reference voltage Vbg (i.e., a to-be-compared voltage) and the third temperature voltage 2Vbe1 received from the compare subject voltage output unit 110.

That is, when the reference voltage Vbg is greater than the third temperature voltage 2Vbe1, the temperature range decision unit 120 determines that the external temperature is high and then increases the third temperature voltage 2Vbe1 by a certain amount. It compares the reference voltage and the increased third temperature voltage again and then further increases the third temperature voltage 2Vbe1 according to the comparison result.

Meanwhile, when the reference voltage Vbg is smaller than the third temperature voltage 2Vbe1, the temperature range decision unit 120 determines that the external temperature is low and decreases the third temperature voltage 2Vbe1 by a certain amount. It compares the reference voltage and the decreased third temperature voltage again and then further decreases the third temperature voltage 2Vbe1 according to the comparison result.

A construction and operation of the temperature signal output unit 130 are described below.

Figure 6:
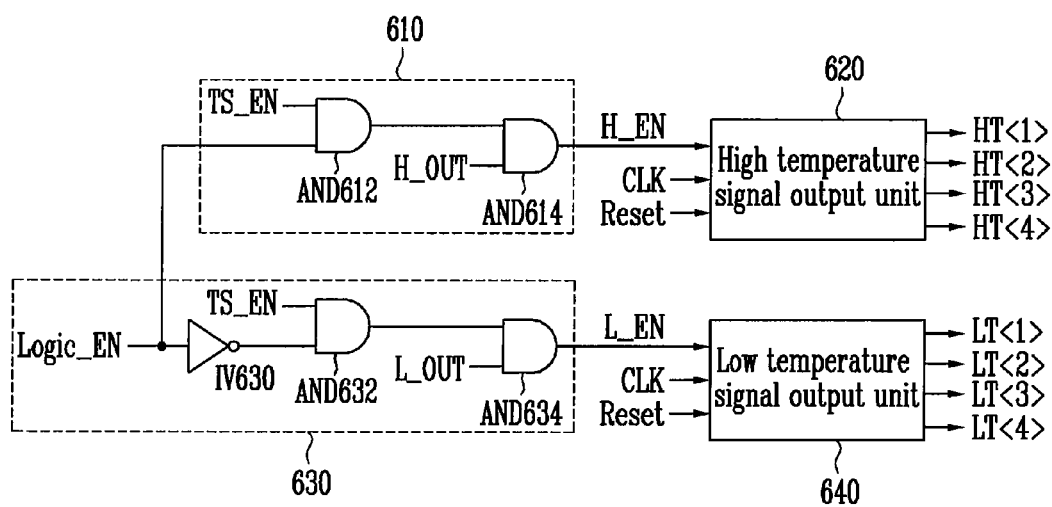
FIG. 6 is a circuit diagram of an internal construction of a temperature signal output unit.

FIG. 6 is a circuit diagram of an internal construction of the temperature signal output unit.

The temperature signal output unit 130 includes the high temperature signal output unit 620 for outputting a specific one of a plurality of high temperature signals, which indicates a range of an external temperature, for a predetermined period of time; the low temperature signal output unit 640 for outputting a specific one of a plurality of low temperature signals, which indicates a range of an external temperature, for a predetermined period of time; a high temperature signal output driver 610 for driving the high temperature signal output unit in response to the enable signal Logic_EN from the temperature range decision unit 120, a driving signal TS_EN of an external temperature sensor, and the high temperature range signal H_OUT; and a low temperature signal output driver 630 for driving the low temperature signal output unit in response to an inverted signal of the enable signal Logic_EN, the driving signal TS_EN of the external temperature sensor, and the low temperature range signal L_OUT.

The high temperature signal output driver 610 receives the driving signal TS_EN of the temperature sensor, the enable signal Logic_EN output from the temperature range decision unit 120, and the high temperature range signal H_OUT, and outputs an enable signal H_EN to drive the high temperature signal output unit 620.

The high temperature signal output driver 610 includes an AND gate AND612 for receiving the driving signal TS_EN and the enable signal Logic_EN as inputs, and an AND gate AND614 for receiving the output of the AND gate AND612 and the high temperature range signal H_OUT as inputs. Thus, only when the driving signal TS_EN, the enable signal Logic_EN, and the high temperature range signal H_OUT are all at a high level, the high temperature signal output driver 610 outputs the enable signal H_EN at a high level to drive the high temperature signal output unit 620.

The low temperature signal output driver 630 receives the driving signal TS_EN of the temperature sensor, the enable signal Logic_EN output from the temperature range decision unit 120, and a low temperature range signal L_OUT, and outputs an enable signal L_EN to drive the low temperature signal output unit 640.

The low temperature signal output driver 630 operates when the enable signal Logic_EN is at a low level. The low temperature signal output driver 630 includes an inverter IV630 for inverting the enable signal Logic_EN of a low level, an AND gate AND632 for receiving the driving signal TS_EN and the inverted enable signal Logic_EN as inputs, and an AND gate AND634 for receiving the output of the AND gate AND632 and the low temperature range signal L_OUT as inputs. Accordingly, only when the driving signal TS_EN, the inverted enable signal Logic_EN, and the low temperature range signal H_OUT are all at a high level, the low temperature signal output driver 630 outputs the enable signal L_EN at a high level to drive the low temperature signal output unit 640.

The high temperature signal output unit 620 receives the enable signal H_EN at a high level, a clock signal CLK, a reset signal Reset and so on as inputs, and maintains a plurality of high temperature signals at a high level in order of higher temperature for a specific period of time as long as the high temperature signal output driving signal H_EN is maintained at a high level. That is, the high temperature signal output unit 620 outputs the plurality of high temperature signals HT<4:1> to specify an external temperature in order of higher temperature (i.e., HT<1>, HT<2>, HT<3>, and HT<4>). The high temperature signals may serve as output signals of the temperature sensor according to the present invention, or control signals to connect specific resistors of the high temperature amplifier 432, included in the temperature range decision unit 120, to the inverting terminal of the operational amplifier OP432.

The low temperature signal output unit 640 receives the enable signal L_EN at a high level, a clock signal CLK, a reset signal Reset and so on as inputs, and maintains a plurality of low temperature signals at a high level in order of lower temperature for a specific period of time as long as the low temperature signal output driving signal L_EN is maintained at a high level. That is, the low temperature signal output unit 640 outputs the plurality of low temperature signals LT<4:1> to specify an external temperature in order of lower temperature (i.e., LT<1>, LT<2>, LT<3>, and LT<4>). The low temperature signals may serve as output signals of the temperature sensor according to the present invention, or function to select a connection node between specific resistors of the low temperature amplifier 442, included in the temperature range decision unit 120.

The constructions of the high temperature signal output unit 620 and the low temperature signal output unit 640 are almost identical to each other, and are described in detail below.

Figure 7A:
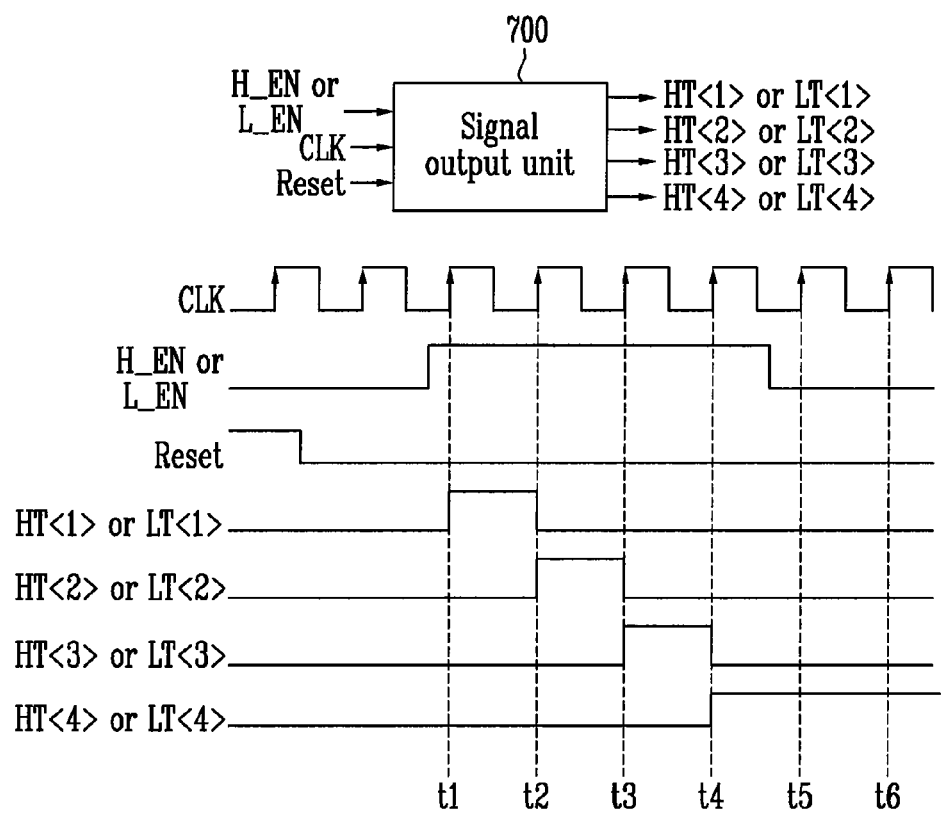
FIG. 7A is a view illustrating an operation of a high temperature signal output unit or a low temperature signal output unit.

FIG. 7A is a view illustrating an operation of the high temperature signal output unit or the low temperature signal output unit.

The high temperature signal output unit or the low temperature signal output unit (hereinafter, referred to as a "signal output unit 600") includes a shift resistor to which a plurality of D flip flops are connected. For simplicity, it has been shown that the number of test signals is four.

The signal output unit 600 operates while the enable signal H_EN or L_EN at a high level is applied, and outputs a temperature signal HT<n> or LT<n> at a high level at the rising edge of the clock signal. As shown in FIG. 7A, at points of time where the clock signal rises, the temperature signals at a high level are output sequentially.

However, if the enable signal shifts to a low level, a temperature signal at the moment when the signal shifts is maintained at a high level for a certain period. The signal that is maintained at a high level for a certain period as described above becomes a signal indicating a current external temperature. The signal becomes an output of the external temperature sensor. The signal may be maintained at a high level for a predetermined time, which is twice or more longer than that of other temperature signals that are maintained at a high level. Thereafter, if the reset signal Reset of a high level is applied, each temperature signal is reset to a low level at the rising edge of the clock signal. As described above, a signal indicating the range of an external temperature is output, and a code signal indicating the range of the external temperature can be formed accordingly.

Figure 7B:
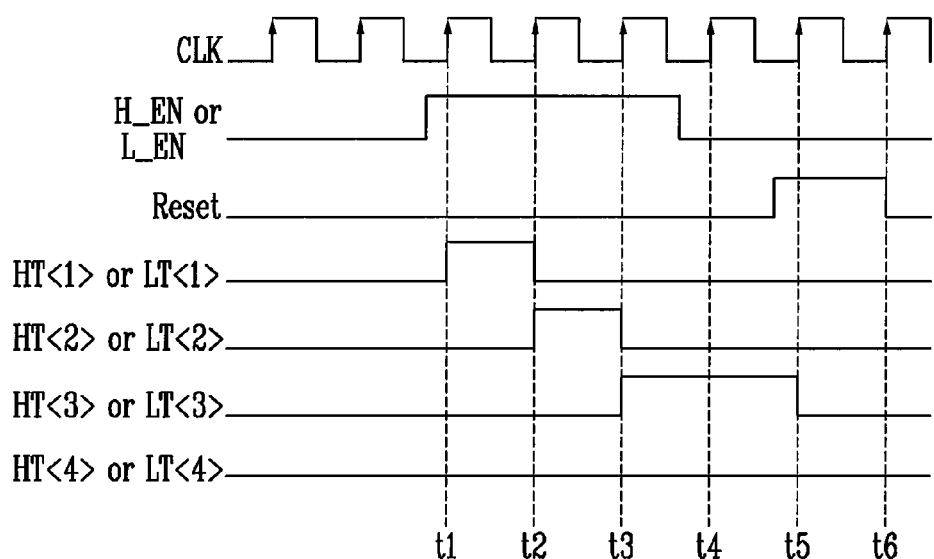
FIG. 7B shows a waveform illustrating an operation of a signal output unit.

FIG. 7B shows a waveform illustrating an operation of the signal output unit.

It is first assumed that a current temperature is in the range of HT<2> and HT<3>. Since the reference voltage is greater than the third temperature voltage 2Vbe1, the temperature signal output controller 420 outputs the enable signal Logic_EN at a high level. The temperature signal output unit 130 operates in response to the enable signal Logic_EN, and outputs the first high temperature signal HT<1> (at a point of time to). The switching element SW7 of the high temperature amplifier 432 is turned on in response to the first high temperature signal HT<1> and the third temperature voltage 2Vbe1 is amplified as much as ΔHT<1>. As can be seen from the graph of FIG. 8, the reference voltage is still greater than an amplified third temperature voltage 2Vbe1 despite such amplification. Thus, the low temperature range signal output unit 434 outputs the high temperature range signal H_OUT at a high level.

The temperature signal output unit 130 outputs the second high temperature signal HT<2> (at a point of time t2) in response to the high temperature range signal H_OUT. In response thereto, the switching element SW8 of the high temperature amplifier 432 is turned on and the third temperature voltage 2Vbe1 is amplified as much as ΔHT<2>. As can be seen from the graph of FIG. 8, the reference voltage is still greater than an amplified third temperature voltage 2Vbe1 despite such amplification. Therefore, the high temperature range signal output unit 434 outputs the high temperature range signal H_OUT at a high level.

In response to the high temperature range signal, the temperature signal output unit 130 outputs the third high temperature signal HT<3> (at a point of time t3). The switching element SW9 of the high temperature amplifier 432 is turned on in response to the third high temperature signal HT<3> and the third temperature voltage 2Vbe1 is amplified as much as AHT<3>. As can be seen from the graph of FIG. 8, the reference voltage is smaller than the reference voltage due to such amplification. Thus, the high temperature range signal output unit 434 outputs the high temperature range signal H_OUT at a low level. In response thereto, the high temperature signal output driver 610 of the temperature signal output unit 130 outputs the enable signal H_EN at a low level. As described above, the third high temperature signal HT<3> at the moment when the enable signal shifts to a low level is maintained at a high level for a certain period. Thereafter, if the reset signal Reset at a high level is applied, the third high temperature signal HT<3> is reset to a low level at the rising time of the clock signal.

In other words, the temperature signal output unit 130 outputs a specific high temperature signal or a specific low temperature signal or feeds back the signal to the temperature range decision unit 120 in response to an output signal of the temperature range decision unit 120

According to embodiments of the present invention, a code signal indicating a range of an external temperature can be formed. The code signal can be used to generate a code signal that may change a voltage, a clock, etc., which have an effect on a cell operation of semiconductor devices. Further, time taken to cut a fuse can be reduced compared with a temperature sensor using a method of cutting a fuse. Accordingly, there is an advantage in that time expended to test products can be reduced.

Although the foregoing description has been made with reference to specific embodiments, it is to be understood that changes and modifications of the present invention may be made by one ordinary skilled in the art without departing from the spirit and scope of the present invention and appended claims.

What is claimed is:

1. A temperature sensor comprising:
a compare subject voltage output unit for outputting a reference voltage having a constant value irrespective of a change of an external temperature and a third temperature voltage that decreases in response to an increase of an external temperature;
a temperature range decision unit for comparing the reference voltage and the third temperature voltage and outputting an enable signal, wherein the enable signal indicates whether the external temperature is higher or lower than a predetermined temperature; and
a temperature signal output unit having a plurality of high temperature outputs and a plurality of low temperature outputs, each of the high temperature outputs corresponding to a specific high temperature signal of corresponding plurality of high temperature signals and each of the low temperature outputs corresponding to a specific low temperature signal of a corresponding plurality of low temperature signals, the temperature signal output unit outputting one of the high and low temperature signals in response to the enable signal, wherein each of the high and low temperature signals are indicative of whether the external temperature lies in a high temperature range or in a low temperature range, respectively,
wherein the temperature range decision unit is connected to the high and low temperature outputs and modifies the third temperature voltage in response to the temperature signal outputted by the temperature signal output unit.

2. The temperature sensor of claim 1, wherein the compare subject voltage output unit comprises a band gap reference circuit for outputting a constant reference voltage irrespective of a change of the external temperature.

3. The temperature sensor of claim 2, wherein the compare subject voltage output unit comprises:
a difference voltage generator for generating a difference voltage between a first voltage applied to a base terminal of a BJT transistor included in the band gap reference circuit and a second voltage applied to an emitter terminal of the BJT transistor; and
a temperature voltage amplifier for amplifying the difference voltage to a specific level or higher and outputting the third temperature voltage.

4. The temperature sensor of claim 3, wherein the third temperature voltage is approximately two times higher than the difference voltage of the first voltage and the second voltage.

5. The temperature sensor of claim 1, wherein:
the temperature range decision unit increases the third temperature voltage in response to the high temperature signal, compares the reference voltage and the increased third temperature voltage, and outputs a high temperature range signal to control driving of the temperature signal output unit according to the comparison result, or
the temperature range decision unit decreases the third temperature voltage in response to the low temperature signal, compares the reference voltage and the increased third temperature voltage, and outputs a low temperature range signal to control driving of the temperature signal output unit according to the comparison result.

6. The temperature sensor of claim 1, wherein the temperature range decision unit comprises:
a temperature signal output controller for comparing the reference voltage and the third temperature voltage, and outputting the enable signal at a high level when the external temperature is higher than the predetermined temperature or outputting the enable signal at a low level when the external temperature is lower than the predetermined temperature;
a high temperature range decision unit for increasing the third temperature voltage in response to the high temperature signal, comparing the reference voltage and the increased third temperature voltage, and controlling operation of the temperature signal output unit according to the comparison result; and
a low temperature range decision unit for decreasing the third temperature voltage in response to the low temperature signal, comparing the reference voltage and the decreased third temperature voltage, and controlling operation of the temperature signal output unit according to the comparison result.

7. The temperature sensor of claim 6, wherein the temperature signal output controller comprises an operational amplifier having a non-inverting terminal to which the reference voltage is input and an inverting terminal to which the third temperature voltage is input, the operational amplifier being configured to compare the reference voltage and the third temperature voltage.

8. The temperature sensor of claim 6, wherein the high temperature range decision unit comprises:
a high temperature amplifier for increasing the third temperature voltage to a specific level or higher in response to the specific high temperature signal; and
a high temperature range signal output unit for comparing the reference voltage and the amplified third temperature voltage, and outputting a signal to control operation of the temperature signal output unit when the reference voltage is greater than the amplified third temperature voltage as a result of the comparison.

9. The temperature sensor of claim 8, wherein the high temperature range signal output unit outputs a high temperature range signal at a high level so that a high temperature signal is output when the reference voltage is greater than the amplified third temperature voltage, wherein the high temperature signal indicates a temperature range higher than the specific high temperature signal.

10. The temperature sensor of claim 8, wherein the high temperature amplifier comprises:
an operational amplifier having a non-inverting terminal to which the third temperature voltage is input;
a feedback resistor for connecting an output terminal and an inverting terminal of the operational amplifier;
a plurality of resistors connected to the inverting terminal of the operational amplifier in response to a specific one of the plurality of high temperature signals; and
a plurality of switching elements for connecting a specific one of the plurality of resistors to the inverting terminal of the operational amplifier in response to a specific one of the plurality of high temperature signals.

11. The temperature sensor of claim 10, wherein the high temperature amplifier connects a resistor having a lower resistance, of the plurality of resistors, to the inverting terminal of the operational amplifier when a high temperature signal indicating a higher temperature, of the plurality of high temperature signals, is input.

12. The temperature sensor of claim 10, wherein the high temperature amplifier further increases the increment of the third temperature voltage when a high temperature signal indicating a higher temperature, of the plurality of high temperature signals, is input.

13. The temperature sensor of claim 8, wherein the high temperature range signal output unit comprises an operational amplifier having a non-inverting terminal to which the reference voltage is input and an inverting terminal to which the amplified third temperature voltage is input, wherein the high temperature range signal output unit is configured to compare the reference voltage and the amplified third temperature voltage.

14. The temperature sensor of claim 6, wherein the low temperature range decision unit comprises:
a low temperature amplifier for decreasing the third temperature voltage to a specific level or more in response to the specific low temperature signal; and
a low temperature range signal output unit for comparing the reference voltage and the decreased third temperature voltage, and outputting a signal to control operation of the temperature signal output unit when the reference voltage is greater than the decreased third temperature voltage as a result of the comparison.

15. The temperature sensor of claim 14, wherein the low temperature range signal output unit outputs a low temperature range signal at a high level so that a low temperature signal is output when the reference voltage is smaller than the decreased third temperature voltage, wherein the low temperature signal indicates a temperature range lower than the specific low temperature signal.

16. The temperature sensor of claim 14, wherein the low temperature amplifier comprises:
an operational amplifier having a non-inverting terminal to which the third temperature voltage is input, and an output terminal and an inverting terminal connected to each other;

a plurality of resistors connected in series to one another and configured to distribute an output voltage of the operational amplifier; and a plurality of switching elements for selecting a specific connection node between the resistors in response to a specific one of the plurality of high temperature signals and controlling a voltage dividing ratio.

17. The temperature sensor of claim 16, wherein the low temperature amplifier controls the voltage dividing ratio to increase the decrement of the third temperature voltage when a low temperature signal indicating a lower temperature, of the plurality of low temperature signals, is input.

18. The temperature sensor of claim 14, wherein the low temperature range signal output unit comprises an operational amplifier having a non-inverting terminal to which the reference voltage is input and an inverting terminal to which the amplified third temperature voltage is input, the low temperature range signal output unit being configured to compare the reference voltage and the amplified third temperature voltage.

19. The temperature sensor of claim 6, wherein the temperature signal output unit comprises:

a high temperature signal output unit for outputting a specific one of the plurality of high temperature signals for a certain period, wherein the specific one of the plurality of high temperature signals indicates a range of the external temperature,;

a low temperature signal output unit for outputting a specific one of the plurality of low temperature signals for a certain period, wherein the specific one of the plurality of low temperature signals indicates a range of the external temperature;

a high temperature signal output driver for driving the high temperature signal output unit in response to the enable signal, a driving signal of an external temperature sensor, and the high temperature range signal; and a low temperature signal output driver for driving the low temperature signal output unit in response to an inverted signal of the enable signal, a driving signal of the external temperature sensor, and the low temperature range signal.

20. The temperature sensor of claim 19, wherein the high temperature signal output unit maintains the plurality of high temperature signals at a high level for a specific period of time in order of higher temperature while the high temperature signal output driving signal is maintained at a high level.

21. The temperature sensor of claim 20, wherein the high temperature signal output unit maintains a high temperature signal during a period approximately two times longer than the certain period, and outputs the high temperature signal as an output signal indicating the external temperature, the high temperature signal being output at the moment when the high temperature signal output driving signal shifts from a high level to a low level,.

22. The temperature sensor of claim 19, wherein the low temperature signal output unit maintains the plurality of low temperature signals at a high level for a specific period of time in order of lower temperature while the low temperature signal output driving signal is maintained at a high level.

23. The temperature sensor of claim 22, wherein the low temperature signal output unit maintains a low temperature signal during a period approximately two times longer than the certain period, and outputs the high temperature signal as an output signal indicating the external temperature, the low temperature signal being output at the moment when the low temperature signal output driving signal shifts from a high level to a low level.

* * * * *